US006533358B1

(12) United States Patent
Avihod

(10) Patent No.: US 6,533,358 B1
(45) Date of Patent: Mar. 18, 2003

(54) KIT FOR CONVERTING A NON-RECLINING WHEELCHAIR INTO A RECLINING WHEELCHAIR

(75) Inventor: Eli Avihod, El Monte, CA (US)

(73) Assignee: Medisol USA, Inc., South El Monte, CA (US)

(*) Notice: Subject to any disclaimer, the term of this patent is extended or adjusted under 35 U.S.C. 154(b) by 0 days.

(21) Appl. No.: 09/710,584

(22) Filed: Nov. 10, 2000

(51) Int. Cl.[7] .................................................. B60N 2/02

(52) U.S. Cl. .................. 297/380; 297/464; 297/354.12; 297/DIG. 4

(58) Field of Search ............................ 297/380, 452.18, 297/354.12, DIG. 4, 467, 464, 465, 468; 280/250.1

(56) References Cited

U.S. PATENT DOCUMENTS 2,522,729 A * 9/1950 Travis
3,674,310 A * 7/1972 Montagano
4,802,683 A * 2/1989 Gillum, Sr.
4,828,325 A * 5/1989 Brooks
4,993,736 A * 2/1991 Garman et al.
5,445,433 A * 8/1995 Avihod
5,520,403 A * 5/1996 Bergstrom et al.
5,865,504 A * 2/1999 Warhaftig

* cited by examiner

*Primary Examiner*—Milton Nelson, Jr.
(74) *Attorney, Agent, or Firm*—Fulwider Patton Lee & Utecht, LLP

(57) ABSTRACT

An improved kit for converting a non-reclining wheelchair into a reclining wheelchair providing replacement side rails which improve patient comfort by preventing the side rail from impinging upon the patient. The replacement side rails are affixed to the frame of the wheelchair after the original side rails are removed. The replacement side rails bend outward to avoid the location of the patient's axilla when the wheelchair is reclined.

13 Claims, 8 Drawing Sheets

KIT FOR CONVERTING A NON-RECLINING WHEELCHAIR INTO A RECLINING WHEELCHAIR

BACKGROUND OF THE INVENTION

1. Field of The Invention

This invention relates to the field of wheelchairs and more particularly to a kit which allows an unadjustable straight backed wheelchair, such as a folding wheelchair, to be converted into an adjustable back wheelchair, wherein the back of the wheelchair can be positioned along a continuum between a fully reclined position and an upright position. Thus converted, the adjustable back wheelchair can readily be used to gradually transition a bed ridden patient from the supine position, to a more upright sitting position. Preferably, the back portion of the kit is shaped to perform corrective thoracic-lumbar-sacral corrective orthosis ("TLSO"), for controlling and correcting unhealthy postural curvature and deformities of the spine. Furthermore, the kit includes several improvements which add to the comfort and mobility of the patients which generally improves their quality of life and speeds recovery and therapy.

2. Description of the Prior Art

Various reclining back wheelchairs are available. One such chair is the BCW recliner chair, offered by Wheelchair Institute of Kansas, of 910 Main Street, LaCrosse, Kans. 67548. Unfortunately, the available reclining chairs are heavy, bulky and very costly when compared to non-reclining wheelchairs.

In contrast, however, most patients have access to or own regular folding or non-folding wheelchairs which are relatively inexpensive. Few prior art wheelchairs provide the patient with adequate back support. Most prior art wheelchairs have pliable backs which allow the patient's back to bend and arch further out of correct alignment, thus causing discomfort or pain to the patient. This problem is acute for patients seated in foldable wheelchair with flexible backs and seats, which tend to hammock. Moreover, presently available reclining back wheelchairs are not TLSO device.

Certain Kits are available to convert these regular folding or non-folding wheelchairs into reclining back wheelchairs and TLSO devices. One such kit is sold by Medisol U.S.A. of 9713 Factorial Way, South El Monte, Calif. 91733 under the name REHABACHAIR. The kit produced by Medisol is described in U.S. Pat. No. 5,445,433 to Avihod, which patent is hereby incorporated by reference in its entirety. These prior art kits have been unable to provide certain features which promote the comfort and mobility of patients.

There accordingly remains a need for a kit which not only can be used to convert a non-reclining straight back wheelchair into a reclining wheelchair but also promotes the comfort and mobility of the patient.

SUMMARY OF THE INVENTION

The invention disclosed herein solves the problems outlined above by providing improvements to a convenient and low cost kit for converting a non-reclining wheelchair into a thoracic-lumbar-sacral corrective orthosis ("TLSO") reclining chair back wheelchair. These improvements promote the comfort and mobility of patients in order to improve their quality of life and promote recovery.

The invention comprises an improved kit for converting a non-reclining wheelchair having two side frames each having a side rail, a seat portion, and a back support portion, into a reclining wheelchair with a thoracic-lumbar-sacral correction orthosis ("TLSO") corrective back supporting chair back which comprises:

a TLSO chair back portion configured to replace the back support of said non-reclining wheelchair such that the TLSO chair back portion may be adjustably reclined;

two replacement side rails configured to replace the two side rails of said non-reclining wheelchair such that the two replacement side rails do not impinge upon the patients axilla while the TLSO chair back portion is reclined.

The invention further provides a wheelchair with a reclining chair back portion allowing a patient to recline, comprising:

a wheelchair having a seat portion and an adjustably reclining chair back portion;

a pair of side frames each having an armrest and a side rail;

each said side rail extends upward terminating in a pushing handle, each said side rail also having an outward and backward bend such that each side rail extends away from the reclining chair back portion and avoids impinging on a reclining patient.

DETAILED DESCRIPTION OF THE PREFERRED EMBODIMENTS

Figure 1:
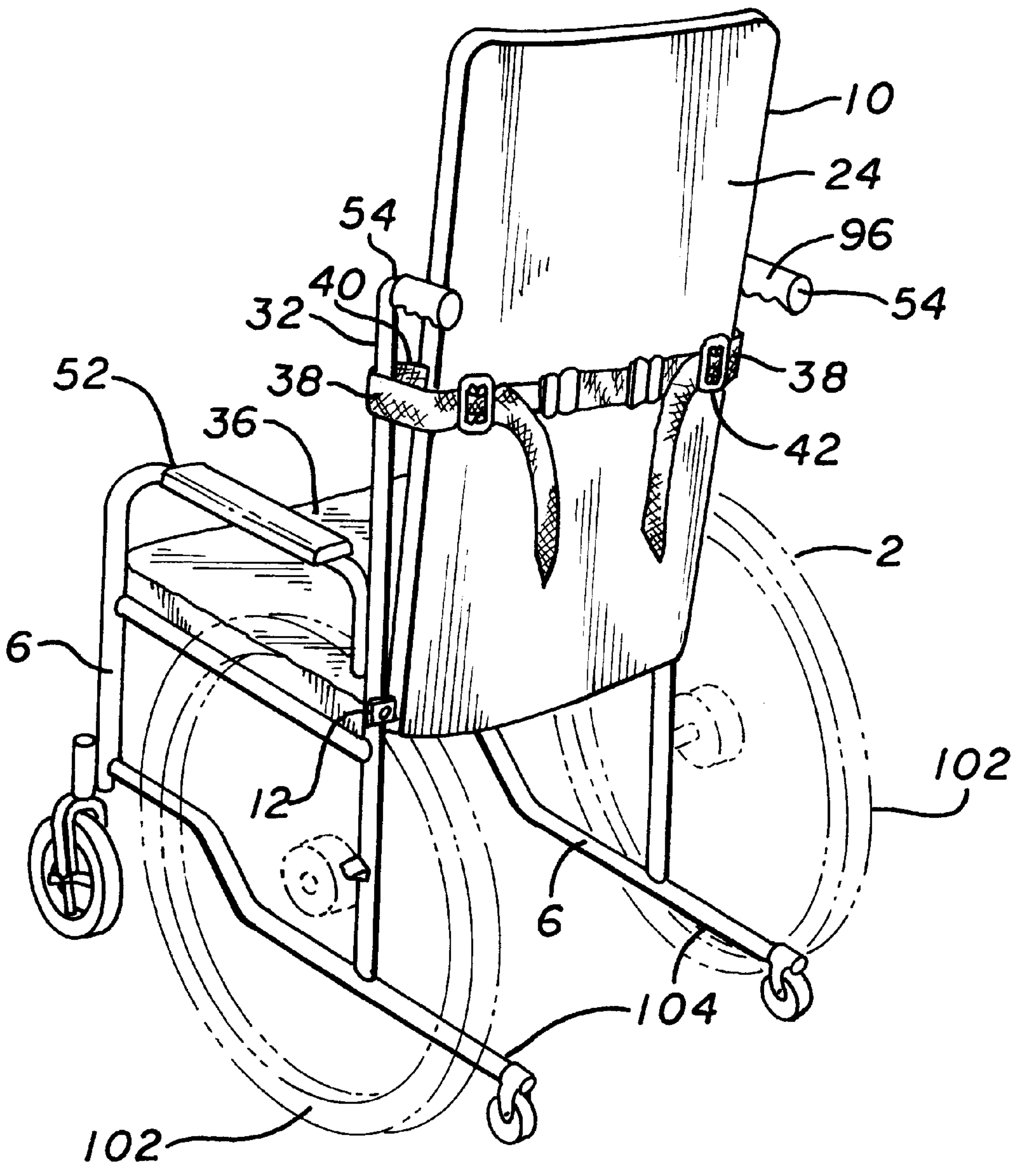
FIG. 1 (Prior Art)
FIG. 1 is a partial rear perspective view of a prior art adjustably reclining wheelchair.

A conventional folding wheelchair has a non-reclining flexible seat back. A prior art kit modifying the conventional wheelchair into a reclining wheelchair 2, as depicted in FIG. 1, replaces the non-reclining flexible seat back with a rigid reclining seatback 10.

The prior art kit also provides for adjustable straps 38 which connect the seat back 4 to the conventional side rails 32. These adjustable straps include loops 40 and snaps, buckles or adjustment rings 42 to modify the length of the straps. The loops wrap around the conventional side rails 32 and back around the rear surface 24 of the seat back. By lengthening or shortening the straps using the buckles the seat back may be adjusted to a variety of reclining configurations. The seat back may also be connected to the conventional side rails by hinged portions 12 in the lower side region 14 of the seat back.

The seat back 10 of the prior art kit is provided in a variety of configurations. The seat back may be curved and/or padded to provide for the individual back support needs of the patient. This seat back may be configured as a thoracic-lumber-sacral correcting orthosis ("TLSO") device. With the TLSO and reclining features of this seat back, the prior art kit has modified a conventional wheelchair into a device providing both rehabilitative care and mobility to a patient.

The prior art kit has also provided several other wheelchair modifications for rehabilitative care. An accessory padded seat cushion 36 may be provided as relatively stiff or soft according to patient needs. Covers may also be provided to cushion the arm rests 52. For patients that require additional support, torso restraining straps may be attached to the seat back 10 and configured to wrap about the torso or abdomen of the patient to avoid slipping.

In a conventional wheelchair 2, the side rails 32 are part of the side frames 6. A typical side frame and side rail assembly is depicted in FIG. 1. Side frames are of various configurations and may include wheel mounts, seat supports, arm rest supports, back rest supports and typically side rails. The side rails generally extend upward immediately behind a patient's seated position and on both sides of the patient. These same side rails typically terminate in rear facing pushing handles 54. The descriptions of the side frames and side rails herein are generic and include the various configurations of side frames and side rails known in the art.

Figure 2:
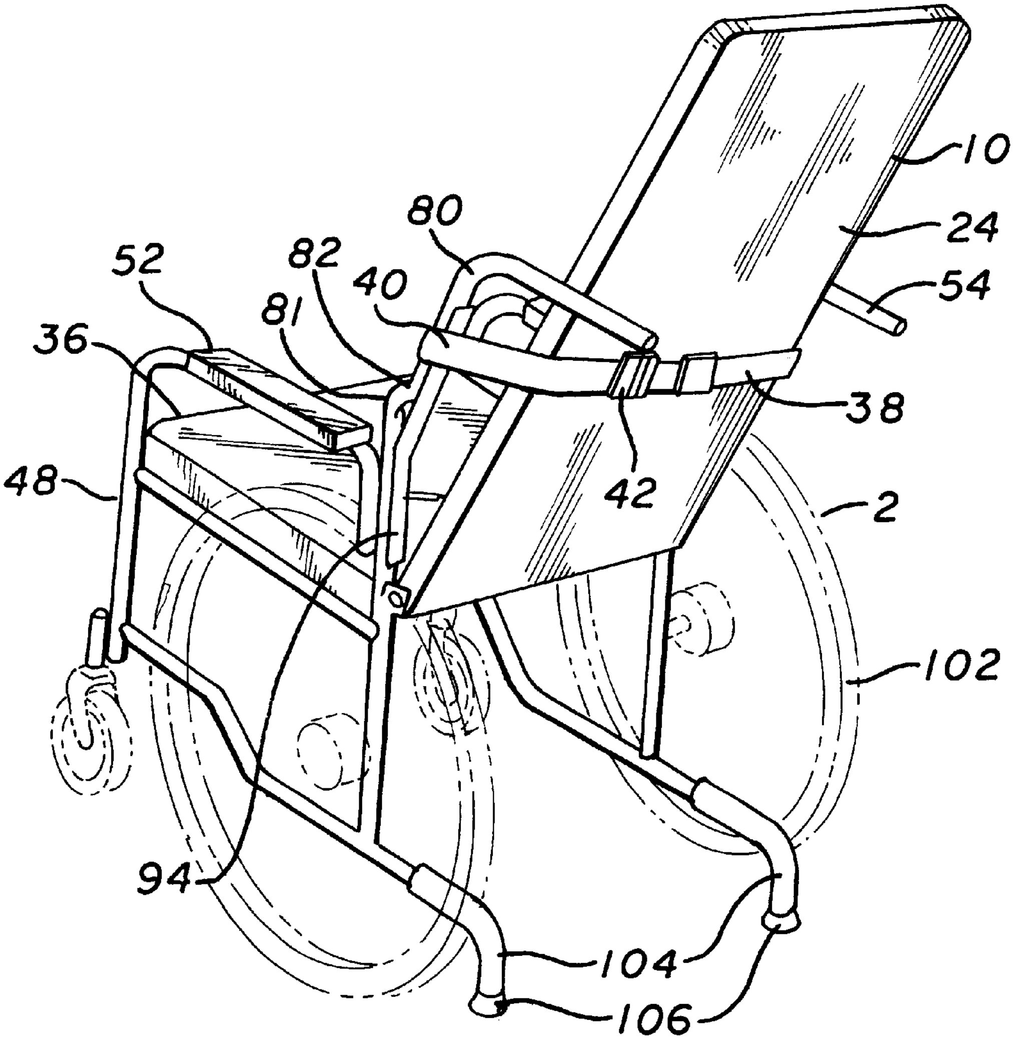
FIG. 2 is a rear perspective view of an adjustably reclining wheelchair equipped with side rails configured to improve patient comfort.

In a preferred embodiment of the present invention, as depicted in FIG. 2, the original side rails 32 of the conventional wheelchair are replaced with a pair of modified side rails 80. The original side rails are typically composed of metallic tubular posts that extend straight upwards from the seat 36 and the armrests 52, terminating in a 90° angle backwards to form the pushing handles 54.

The arrangement of these original side rails 32 has proven uncomfortable for patients when the seat back 10 is reclined. The patients axilla (back of the upper arm or armpit) often impinges upon the original side rail when the patient is reclined. As the seat back is reclined, the patients torso, head and arms extend backward and downward from their otherwise non-reclined position. The side rails, however, remain in their original location which is immediately behind and outward of the patients non-reclined position. Thus, while the patient's arms extend outward, they impinge upon the side rails. This causes discomfort after continued use.

Figure 4:
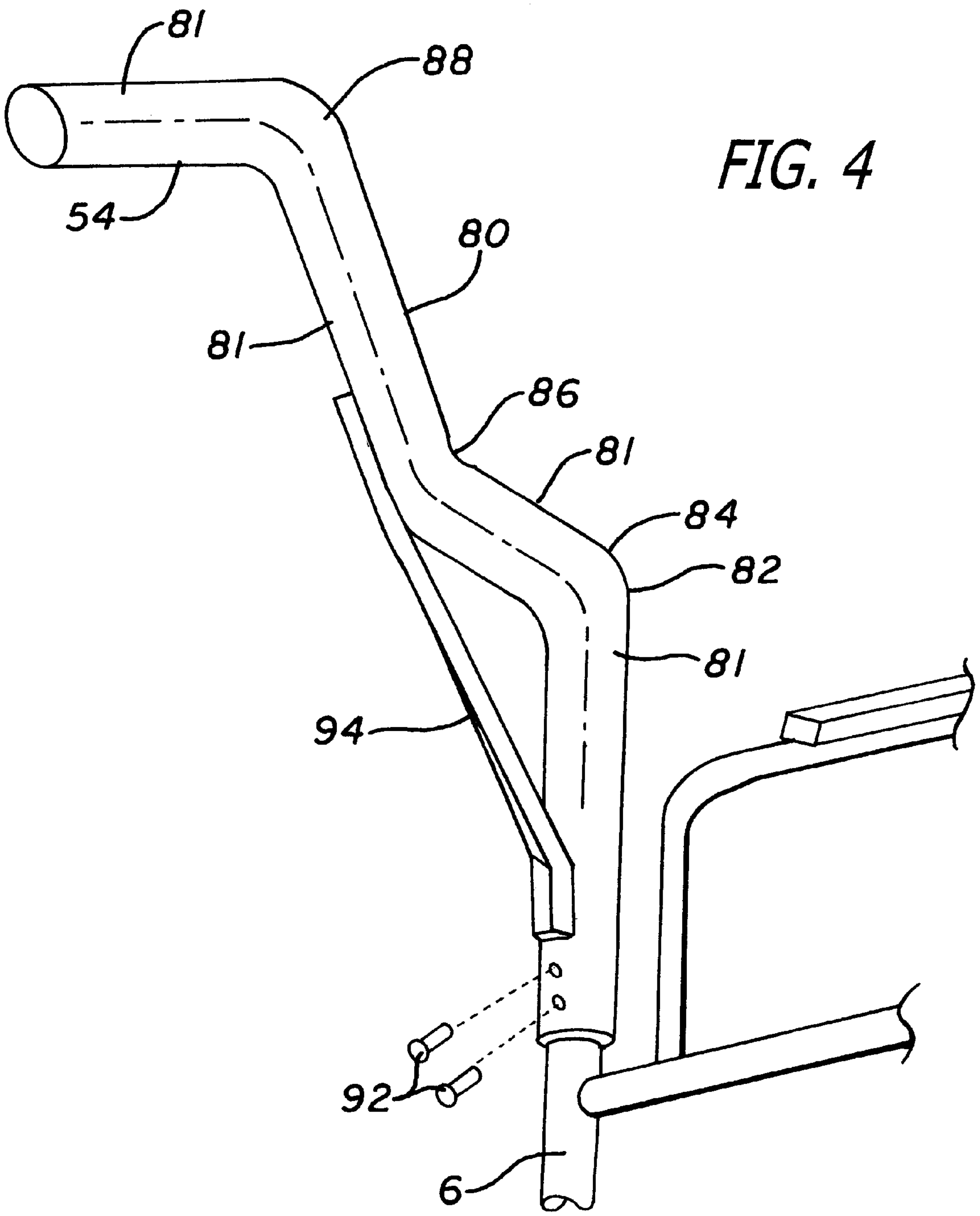
FIG. 4 is a rear perspective view of a side rail connected to a wheelchair.

The modified side rails 80 solve this problem by having at least one bend 82 to avoid impinging upon the patient's upper arm while reclined. In a preferred embodiment, as depicted in FIG. 4, the modified side rail has at least three bends. A first bend 84 (from lower to upper) directs the side rail outward and steeply backward (approximately 60°–75°). A second bend 86 maintains the same outward angle 90 and straightens the backward angle upward. A third bend 88 maintains the same outward angle and directs the side rail horizontally, forming pushing handles 54. This preferred series of bends prevents the patient's axilla from impinging the modified side rail while maintaining the support and mobility functions of the original side rails.

These bends 82 may divide the modified side rails 80 into multiple portions 81. The lower portion (being below the lowest bend) is typically attached to the side frame 6 of the wheelchair 2. The bends further divide the modified rails into a number of intermediate portions depending on the number of bends. The upper portion (being above the uppermost bend) typically forms the pushing handles 54.

These modified side rails 80 also support the adjustable reclining seat 10. Preferably the straps 38 form loops 40 about the modified side rails between the second bend 86 and the third bend 88. The straps then continue about the rear surface 24 of the seat back 10. By adjusting the buckles 42 the length of the straps may be changed, adjusting the recline of the seat back.

Figure 5:
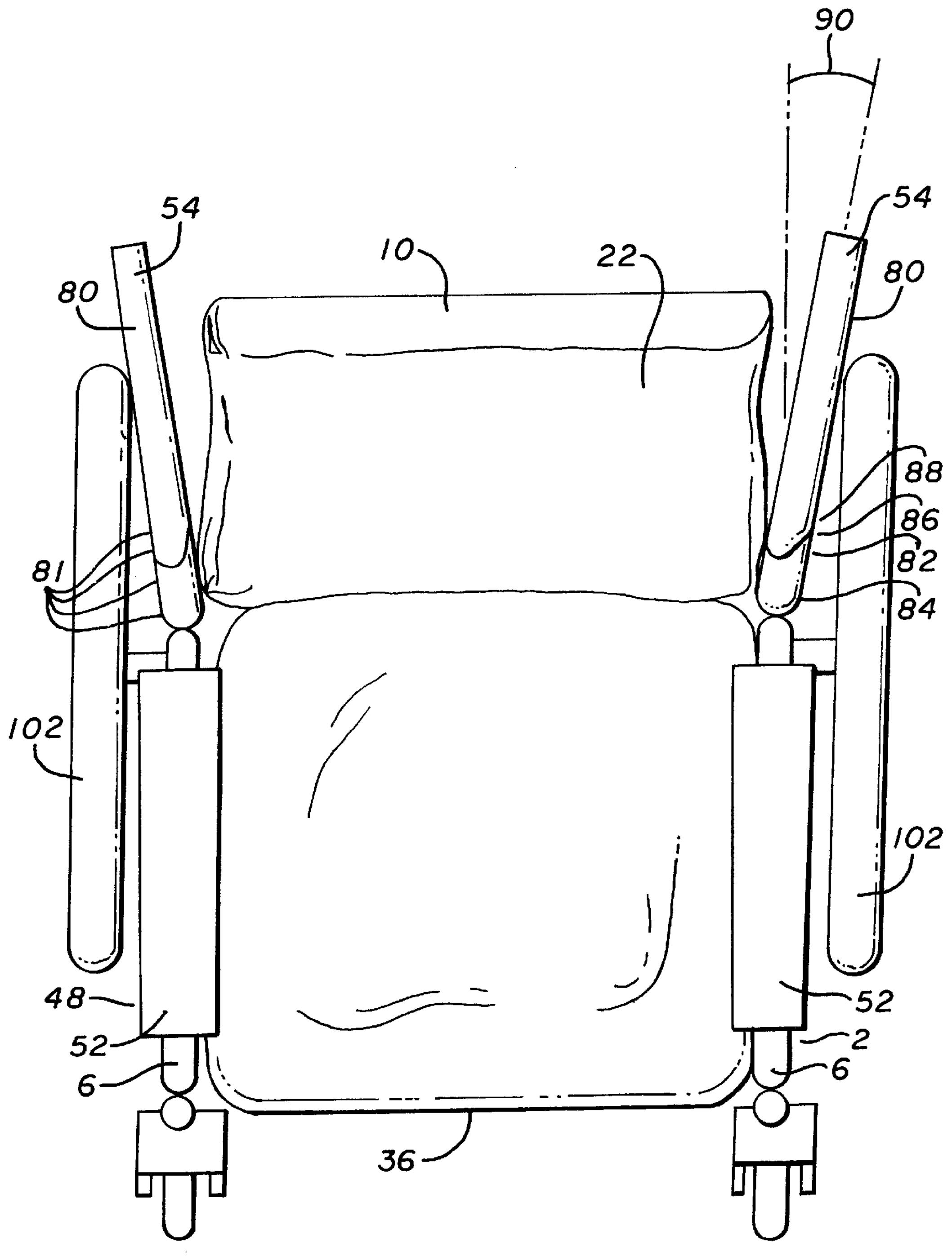
FIG. 5 is a top view of the wheelchair of FIG. 2.

Preferably the outward angle 90 (as seen in FIG. 5) of the modified side rails 80 is not of such great magnitude that the pushing handles 54 extend beyond the wheels of the wheelchair 2. The length of the pushing handles may also need to be minimized to prevent extending beyond the wheels. This ensures the greatest mobility of the wheelchair by maintaining the wheels as the greatest horizontal width of the wheelchair. Thus the addition of the modified side rails does not limit access to openings other than the limit of the wheels of the wheelchair.

Conventional wheelchairs 2 having original side rails 32 may be detachable just above the seat 36. In this configuration the original side rails may be removed by removing the screws, bolts or other fasteners 92 attaching the original side rails to the lower portions of the side frames 6. The modified side rails 80 may thereafter be attached by using the same fasteners.

In other configurations of conventional wheelchairs 2, the original side rails 32 may be cut from the remainder of the wheelchair just above the seat 36. The modified side rails 80 may thereafter be attached to the remainder of the wheelchair by fasteners, welding or other well-known attachment means.

The modified side rails 80 may be composed of tubular metal similar to the construction of the conventional wheelchair. Thus, after the original side rails 32 are removed, either by detaching or cutting, the modified side rails are compatible with the remainder of the wheelchair. That is, the tubular metal of the modified side rail may readily fit over, into or butt up to the tubular metal of the remainder of the wheelchair. Further, if the conventional wheelchair is provided with fasteners and corresponding fastener holes attaching the original side rails, the modified side rails may be supplied with corresponding fastener holes so that they are readily attached and detached.

Preferably, each modified side rail 80 further comprises a brace 94. This brace provides additional mechanical support for the modified side rail. The brace may be composed of a metallic bar securely affixed to the tubular metal of the modified side rails, such as by welding. In a preferred arrangement, the ends of the brace are securely affixed below the first bend 84 and between the second bend 86 and third bend 88. The brace reinforces the modified side rails which require sufficient strength to support the reclining seat back and the weight of a reclining patient. The brace transmits the forces upon the upper portion of the modified side rail to the lower portions of the modified side rail and to the side frame of the wheelchair. The brace may be welded to the tubular metal portion of the modified side rail or securely fastened using screws, bolts or other means.

As described above each modified side rail 80 terminates in a pushing handle 54 similar to the original side frame 6. The pushing handle of the modified side rail, however, is oriented at an outward angle 90 (as depicted in FIG. 5). This outward angle facilitates the mobility of the wheelchair 2 by providing greater leverage in turning the wheelchair using the pushing handles. Similar to the conventional wheelchair, the pushing handles may include a handgrip 96 for easier manipulation.

Figure 3:
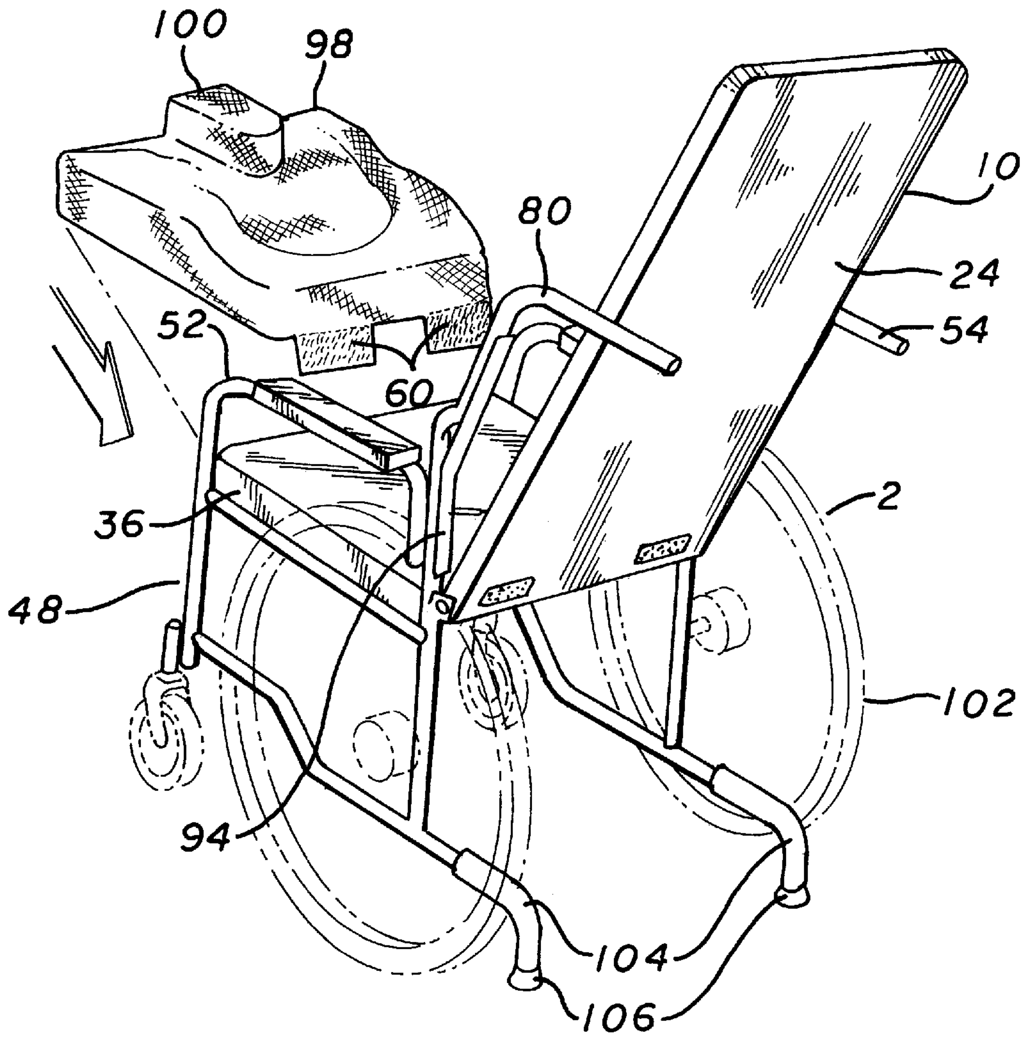
FIG. 3 is a rear perspective view of the wheelchair of FIG. 2 further configured to include a non-slip seat support.

The improved kit for modifying a conventional wheelchair 2 into a reclining TLSO wheelchair may also provide several other optional features to provide for patient comfort and facilitate rehabilitation. In FIG. 3 a non-slip seat cushion 98 is depicted as an accessory. The non-slip seat cushion 98 fits over the seat 36 on the wheelchair 2. The non-slip seat cushion maybe molded to accommodate the legs and buttocks of the patient while seated or reclining in the wheelchair. The non-slip seat cushion 98 may include a wedge 100 situated to fit between the patient's legs and prevent slouching. These accessories may be used for those patients with posture control disabilities or to improve comfort. The non-slip seat cushion maybe composed of molded foam covered with fabric.

Preferably, the non-slip seat cushion 98 is secured to the wheelchair 2 by flaps 60 attached near the rear of the cushion. These flaps may be threaded underneath the seat back 10 and removably attached to the rear surface 24 thereof. The attachment may be performed by snaps, hook and loop material, or other well-known attachment means.

Figure 6:
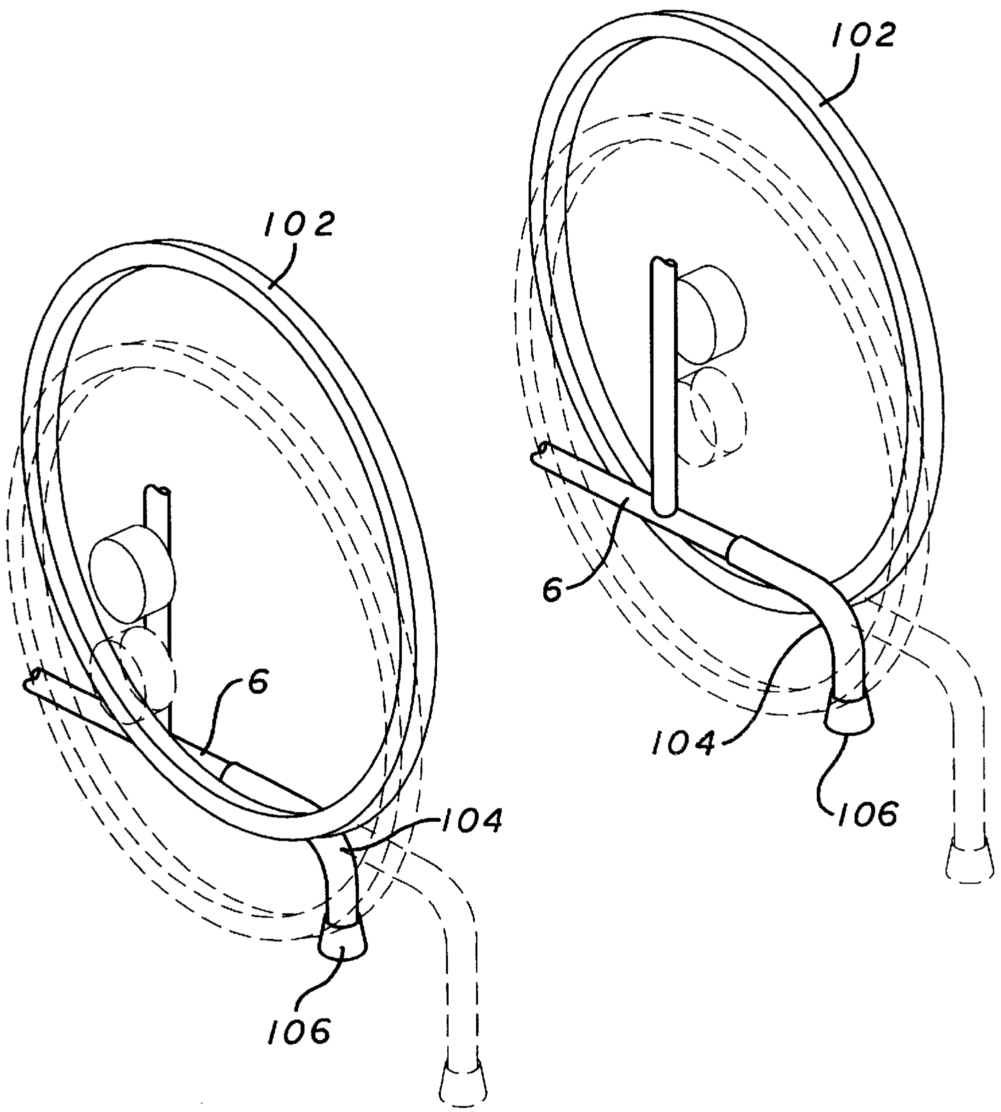
FIG. 6 is a rear perspective view of a pair of adjustable wheel assemblies and adjustable rear supports.

Other accessories, such as depicted in FIG. 6, maybe used to modify the conventional wheelchair 2 for increased comfort and mobility. The wheels 102 may be adjusted on the side frame 6 of the wheelchair to adjust the height of the chair itself. By attaching the wheels in a lower position on the side frame raises the seat 36 and patient. Raising the wheels on the side frame provides a lower seat for the patient. The wheels are typically bolted to the side frame at the center (or axle) of the wheel. Thus, the wheels may be attached and reattached by removing and replacing these bolts.

The kit may also provide extended rear supports 104. The conventional rear support may be replaced with a rear support that extends further downward and/or backward. A rear support that extends further downward is particularly useful in a wheelchair 2 that is modified with wheels in a lower position. A rear support that extends further backward is particularly useful in a wheelchair that includes a reclining seat back 10. While reclined the weight of a patient is centered further back on the wheelchair. To prevent tipping backward the wheelchair requires a rear support that extends further back to support the weight.

These rear supports may be composed of tubular metal with wheels (not shown) or knobs 106 affixed to the end. The extended rear supports may replace the original rear supports by detaching or cutting the original rear support and attaching the extended rear support in their place. This may be performed using similar means described above for attaching the modified side frames 32.

Figure 7:
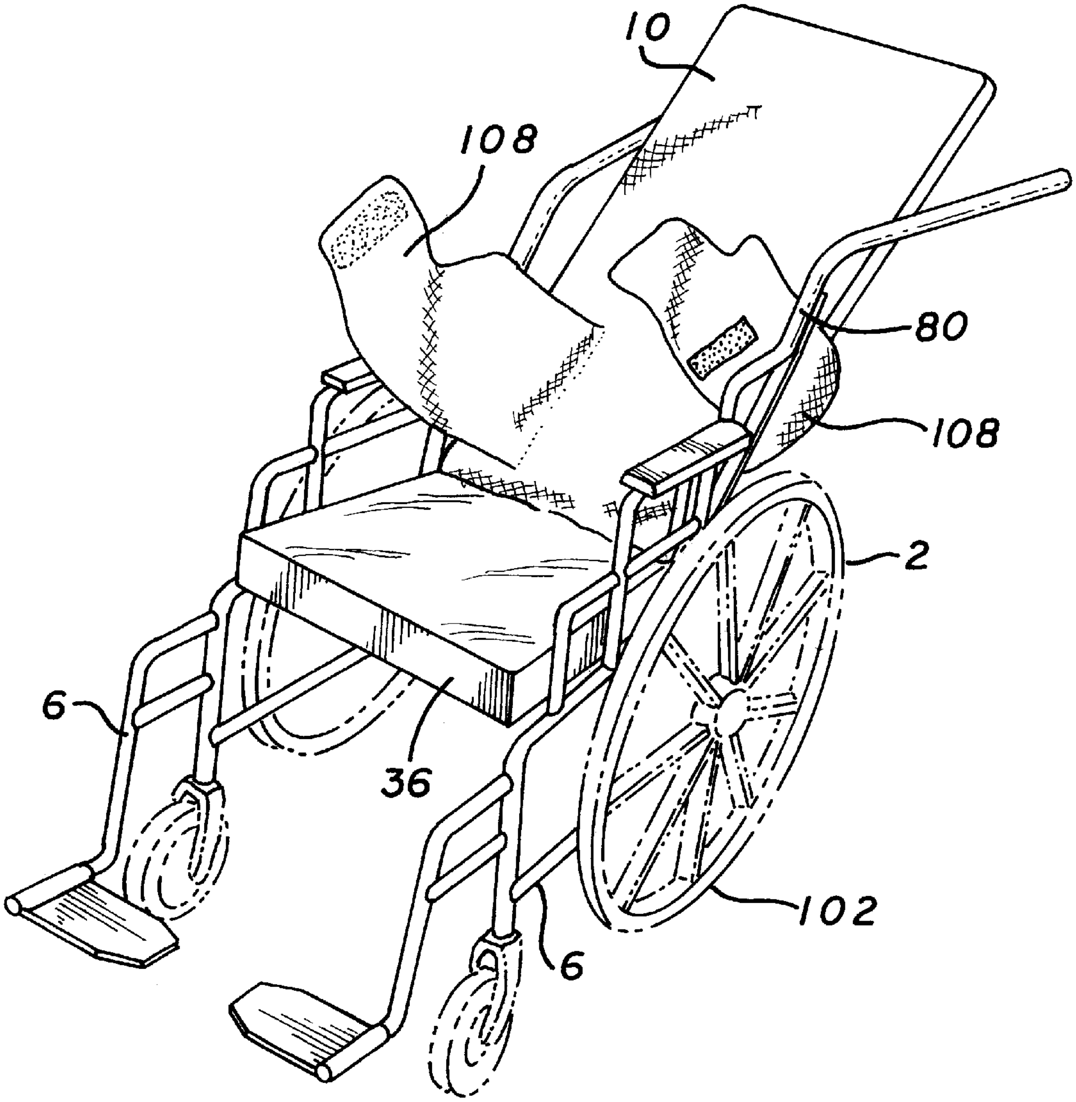
FIG. 7 is a front perspective view of the wheelchair of FIG. 2 further including a torso support system.
Figure 8:
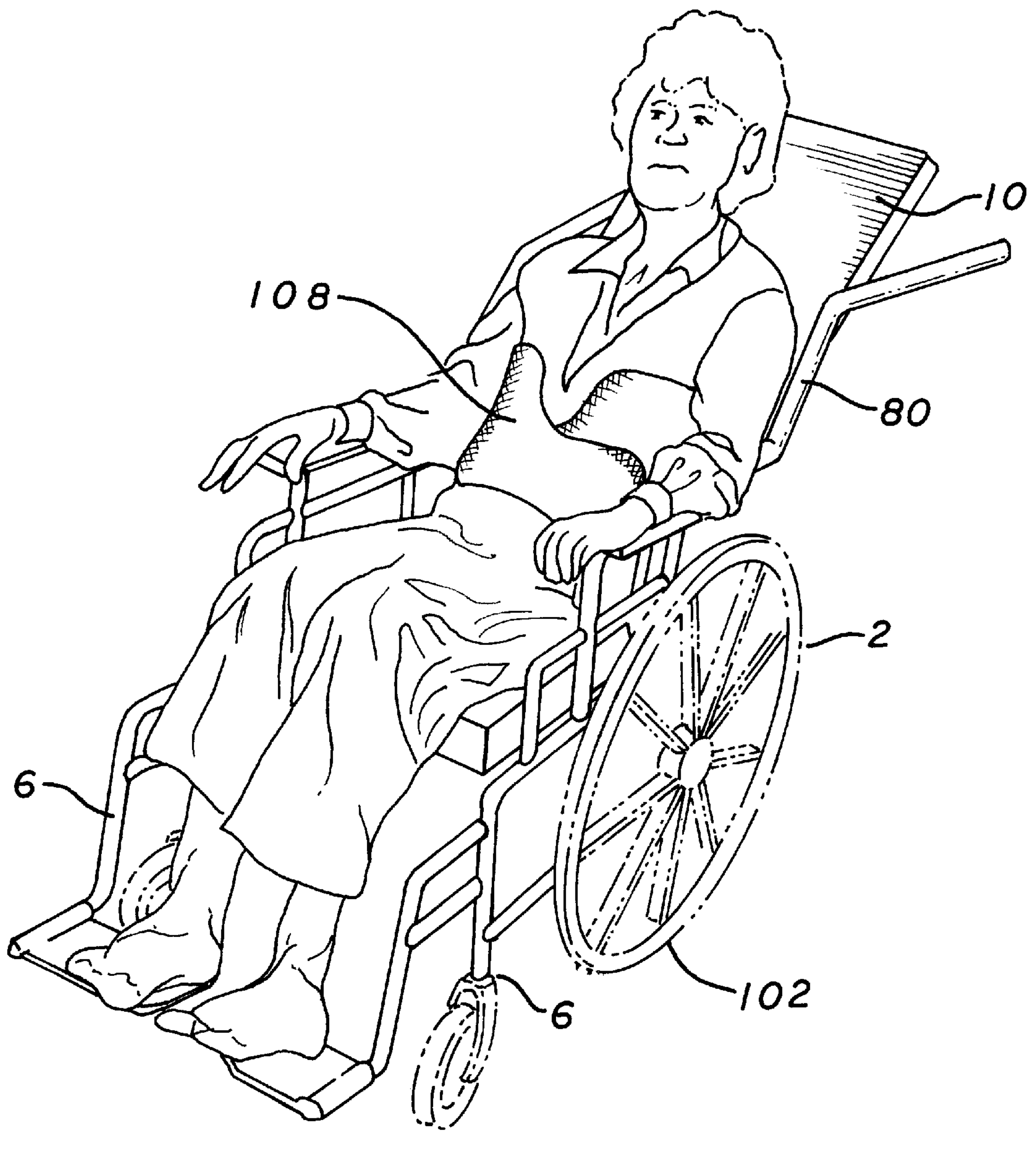
FIG. 8 is a front perspective view of the wheel chair of FIG. 7 depicting a patient within the wheelchair and torso support system.

The wheelchair 2 may also be equipped with support straps 108 as depicted in FIGS. 7 and 8. These support straps fit about the patients torso in the abdominal area. These wide straps not only prevent slouching, they also support the patients abdomen and chest. This eases breathing in those patients with disabilities limiting support in these areas.

The support straps 108 may be fixedly secured to the seat back 10 at either the front surface 22 or rear surface 24. The straps may be sewn into the seat back or otherwise secured. The support straps may then be wrapped abut the patient and removably secured with hook and loop material, snaps, hooks or other fasteners. Preferably, the support straps are padded to ensure patient comfort. Thus the support straps may be composed of padding sewn into fabric materials.

The drawings and the foregoing description are not intended to represent the only form of the invention in regard to the details of its construction and manner of operation. It will be evident to those skilled in the art that modifications and variation may be made without departing from the spirit and scope of the invention. Changes in form and at the proportion of parts, as well as the substitution of equivalents, are contemplated and although specific terms have been employed, they are intended in a descriptive sense only and not for the purpose of limitation, the scope of the invention being delineated in the following claims:

What is claimed:

1. A kit for converting a non-reclining wheelchair having two side frames, two sides rails, a seat portion, and a back support portion, into a reclining wheelchair with a thoracic lumbar-sacral correcting orthosis, referred to as TLSO, corrective back supporting chair back with improved patient comfort, comprising:

an adjustably reclining TLSO chair back portion configured to replace the back support portion of said non-reclining wheelchair by attaching to the two side frames; and two replacement side rails each having at least one bend extending said replacement side rail away from the adjustably reclining TLSO chair back portion and configured to replace the two side rails of said non-reclining wheelchair by attaching to the two side frames, wherein upon replacement of the back support portion and two side rails of said non-reclining wheelchair with the adjustably reclining TLSO chair back portion and the replacement side rails, the comfort of said patient is improved by having the replacement side rails extend away from the adjustably reclining TLSO chair back portion.

2. The kit of claim 1, wherein the replacement side rails each further comprise:

a first, lowest bend directing said replacement side rail both backwards and outwards with respect to a patient seated in the wheelchair, such that the replacement side rail does not impinge upon the patient's axilla when the TLSO chair back portion is reclined.

3. The kit of claim 2, wherein the replacement side rails each further comprise:

a second, highest bend directing said replacement side rail horizontally to form gripping handles.

4. The kit of claim 3, wherein the replacement side rails each further comprise:

a third, intermediate bend which directs the replacement side rail less steeply backward from the first, lowest bend.

5. The kit of claim 1, wherein the replacement side rails each further comprise:

a brace attached to said replacement side rail providing mechanical support.

6. The kit of claim 1, further comprising:

at least one adjustable strap fixed at one end to said TLSO chair back portion and loopable about the replacement side rails and detachably fixable at its other end to the TLSO chair back portion.

7. The kit of claim 1, further comprising:

two adjustable rear supports attached to said side frames, wherein the rear supports may be adjusted backward to support the weight of a reclining patient.

8. A wheelchair configured to adjustably support a reclining patient, comprising:

two side frames;

a reclining chair back hingeably affixed between the two side frames;

two side rails each attached to one of the side frames, and comprising a series of bends, at least one of these bends forming an outward angle such that the side rails avoid impinging upon a reclining patient's axilla; and at least one adjustable strap having two ends each in contact with the reclining chair back, looped about the two side rails and configured to adjust the recline of the chair back by adjusting the length of the strap.

9. The wheelchair of claim 8, further comprising:

a brace having a first end connected to the side rail, a second end connected to the side frame, and configured to support the weight of a reclining patient.

10. The wheelchair of claim 8, further comprising:

at least one support attached to the two side frames and configured to support the weight of a reclining patient.

11. The wheelchair of claim 8 further comprising:

two pushing handles attached to the side rails extending outwardly at an angle to the wheelchair.

12. The wheelchair of claim 8, further comprising:

a seat portion attached to the two side frames having a molded contour to support the reclining patient.

13. The wheelchair of claim 8, further comprising:

a pair of torso support straps each having a first end attached to the reclining chair back and a second end configured to wrap about a patient's torso and releasably attach to the other support strap.

* * * * *

UNITED STATES PATENT AND TRADEMARK OFFICE

CERTIFICATE OF CORRECTION

PATENT NO. : 6,533,358 B1 Page 1 of 1
DATED : March 18, 2003
INVENTOR(S) : Eli Avihod It is certified that error appears in the above-identified patent and that said Letters Patent is hereby corrected as shown below:

Title page,
Item [*], change “0 days” to read -- 19 days --.

Signed and Sealed this

Twenty-fourth Day of June, 2003

JAMES E. ROGAN
*Director of the United States Patent and Trademark Office*